United States Patent [19]

Solomon et al.

[11] 4,255,810

[45] Mar. 10, 1981

[54] JAM RESISTANT FREQUENCY MODULATION SYSTEM

[75] Inventors: Karl Solomon, Haddonfield; George C. Hennessy, Haddon Heights, both of N.J.

[73] Assignee: The United States of America as represented by the Secretary of the Navy, Washington, D.C.

[21] Appl. No.: 427,208

[22] Filed: Jan. 13, 1965

[51] Int. Cl.[3] ........................ H04B 15/00; H04K 1/00; H04L 7/00

[52] U.S. Cl. ........................................ 375/1; 375/106; 375/114; 375/87; 455/26

[58] Field of Search ........................ 325/45, 52, 58, 65, 325/344, 473, 476, 479, 32, 122; 178/5.1, 22; 179/1.5; 375/1, 52, 87, 106, 114; 455/26

[56] References Cited

U.S. PATENT DOCUMENTS

| | | | |
|---|---|---|---|
| 3,475,558 | 10/1969 | Cahn | 375/1 |
| 3,706,933 | 12/1972 | Bidell et al. | 375/1 |

*Primary Examiner*—Howard A. Birmiel

*Attorney, Agent, or Firm*—G. J. Rubens; Henry Hansen

EXEMPLARY CLAIM

1. An interference proof FM video communication system comprising:

means for frequency modulating a carrier frequency by a video signal;

means for bi-phase modulating the output of said frequency modulating means in accordance with a binary code, said phases being 180° apart;

means for transmitting the output signal of said bi-phase modulator;

means remote from said transmitter for receiving said output signal;

means associated with said receiving means for mixing said received signal with a beat frequency signal bi-phase modulated by a generated code substantially identical to said binary code;

means for synchronizing said generated code with said binary code by comparing a filtered and an unfiltered value of the output of said mixing means;

means for holding said generated code in synchronization with said binary code by correlating said received signal bi-phase modulated according to said generated code with said received signal bi-phase modulated according to a time-delayed version of said generated code; and means for detecting said video signal from the output of said mixing means.

10 Claims, 8 Drawing Figures

Fig. 3
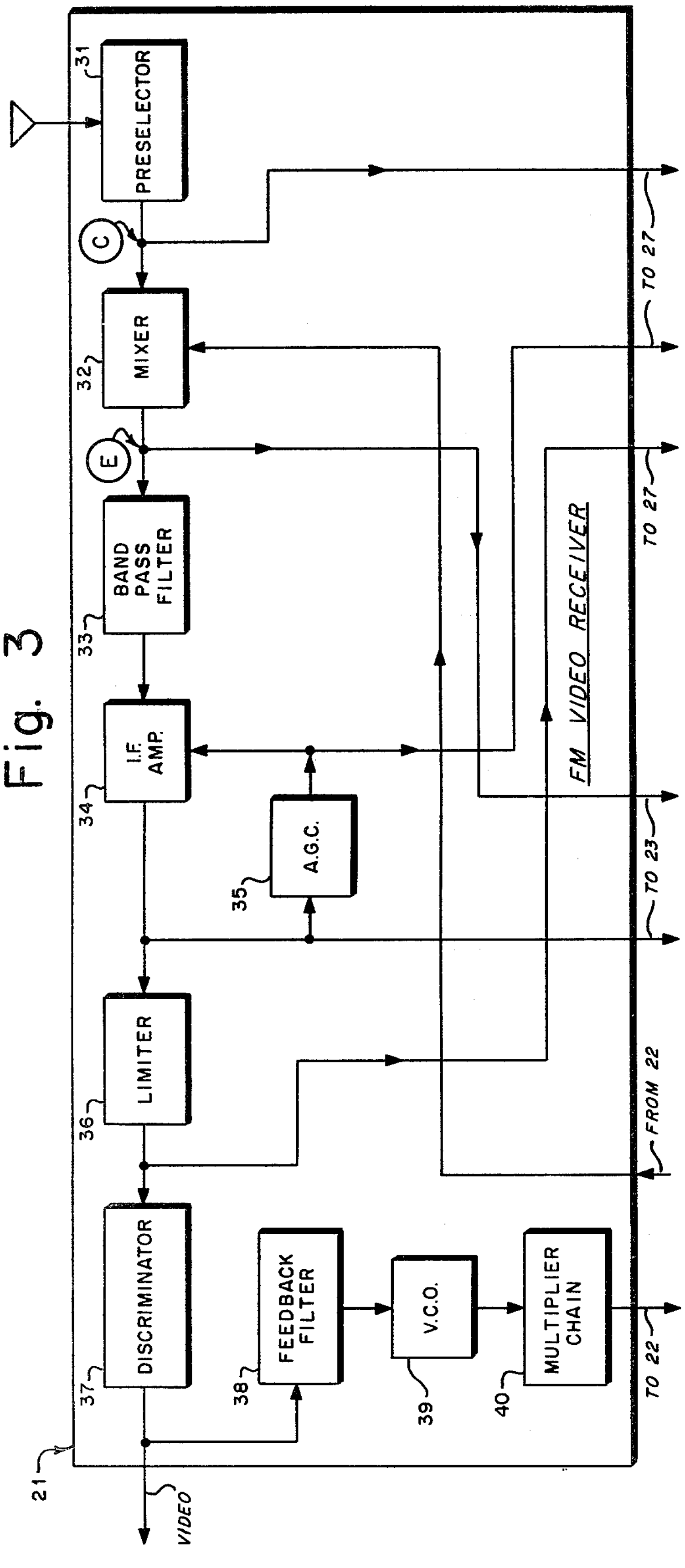
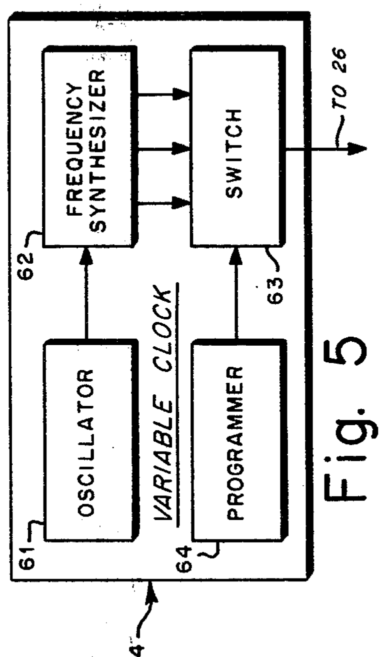
Fig. 5
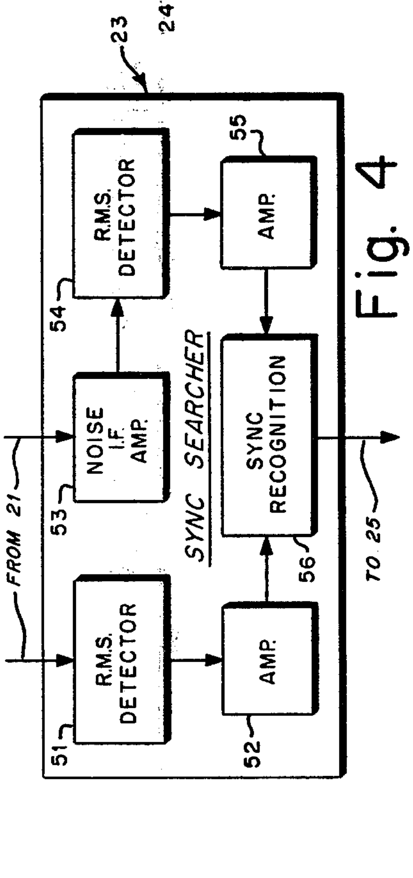
Fig. 4

JAM RESISTANT FREQUENCY MODULATION SYSTEM

The present invention relates to video communication systems, and more particularly to a frequency modulated coded video communication system which provides protection against interference, deliberate and otherwise.

FM transmission in general, and FM video transmission in particular, possess the advantage of filtering out noise by utilizing the correlation between plural sidebands of the same signal. The advantage of this over noise levels is not unlimited, and when deliberate interference (jamming) is involved the transmitted signal is blotted out with a fair degree of ease.

The general purpose of this invention is to provide an FM video transmission system which has a substantial improvement factor for transmission in the presence of interference. To attain this the present invention contemplates the use of a bi-phase modulator driven by a random code generator which modulates the output of a standard frequency modulator. In the receiver the received signal is again bi-phase modulated with the same random code to remove the coding and restore the original FM radio frequency. The invention also has a synchronizing means and a lock means to find and hold synchronization between the received signal and the random code generated in the receiver itself. To attain this the output of an IF amplifier after passage through a band-pass filter is compared with the output of an IF amplifier without the band-pass filter. When the output from the filtered amplifier reaches a certain level above the output from the unfiltered amplifier it indicates that the various sidebands are correlating and that therefore the codes received and generated are synchronized. To hold the code in the synchronization lock position the received signal is modulated by a bi-phase modulator driven by an adder signal which is the combination of the code one-half a bit early and a code one-half a bit late. This modulated signal is then compared with the received signal which has been modulated by the generated code. If a degree of correlation with either the early or the late signal is noted, the voltage controlled oscillator which controls the rate of bit generation is speeded up or slowed down as appropriate to bring the generated code in the receiver in line with the code in the received signal.

Accordingly, it is an object of this invention to provide a video FM communications system which provides a substantially improved resistance to interference.

Another object of the invention is to provide means in the receiver for synchronizing a code generator in the receiver with a code imposed upon the received signal.

Yet another object of the invention is to provide means in the receiver for holding the receiver code generator in synchronization with the received signal.

Other objects and many of the attendant advantages of this invention will be readily appreciated as the same becomes better understood by reference to the following detailed description when considered in connection with the accompanying drawings in which like reference numerals designate like parts throughout the figures thereof and wherein:

FIG. 3 shows a block schematic diagram of a frequency modulation superhetrodyne receiver within the receiver system of FIG. 2;

FIG. 4 shows a block schematic diagram of the synchronization searcher in the receiver system of FIG. 2;

FIG. 5 shows a block schematic diagram of a variable clock in the receiver system of FIG. 2;

Figure 1:
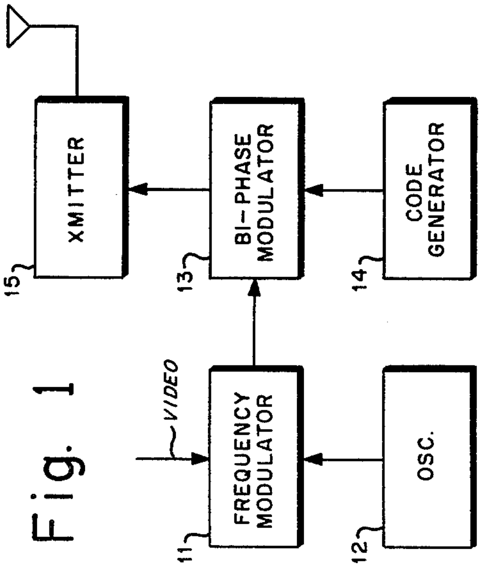
FIG. 1 shows a block schematic diagram of the video transmitter system according to the invention.

In FIG. 1 a standard video signal comes into a frequency modulator 11 where it modulates the carrier frequency from an oscillator 12 in accordance with known frequency modulation techniques. The output constituting a frequency modulated carrier signal is lead into a bi-phase modulator 13 which modulates the signal in accordance with the code generated by a code generator 14. The output of code generator 14 will be a series of bits identified as "1"s and "0"s . The bi-phase modulator transmits the incoming signals straight through to a transmitter 15 when the code is a "1" and transmits it through 180° out of phase when the code is a "0". Inasmuch as the bit rate from the code generator 14 is several times the bandwidth of the FM signal the spectrum of the outgoing signal through the transmitter will be spread substantially, as will be explained below in connection with the spread spectrum processing factor. The transmitter 15 then transmits the signal as received from the bi-phase modulator 13.

The bi-phase modulator 13 may be any one of a number of known forms. It may, for example, consist of a pair of modulators feeding into a pair of gates, one modulating in phase and the modulating 180° out of phase from a common oscillator, and the gates being alternately operable according to a signal from a coding mechanism. Such a system is shown in Wieselman et al, U.S. Pat. No. 2,961,482. It may also comprise a resonant cavity with a selectable quarter-wave ground center containing a diode which may be selectably turned on and off to reverse the phase by 180°.

Figure 2:
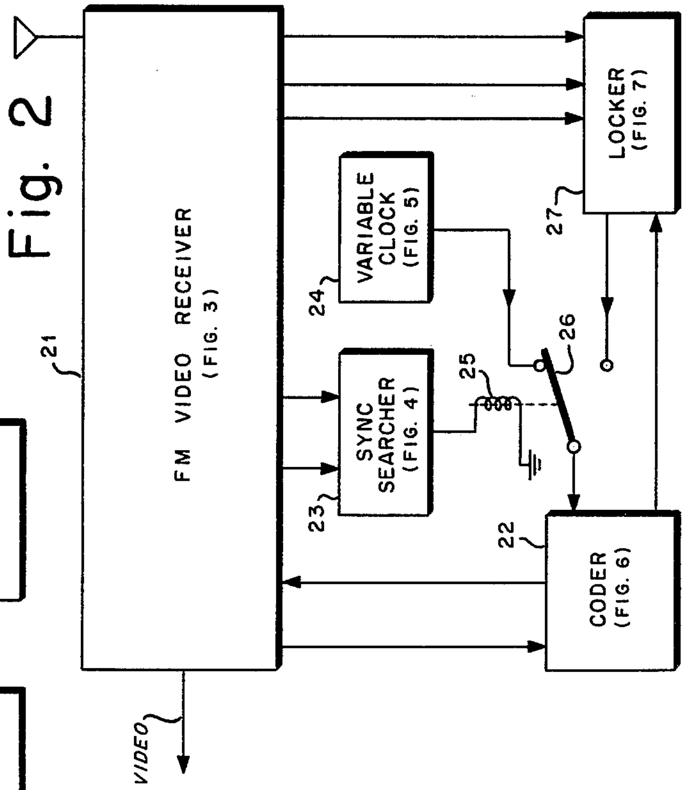
FIG. 2 shows a block schematic diagram of a video receiver system according to the invention.

FIG. 2 shows the receiver system containing a receiver 21 which receives its decoding information from a coder 22. The code coming from the coder 22 is brought into synchronization with the received code by a sync searcher 23 operating in conjunction with a variable clock 24, as will be explained more fully below. When the sync searcher 23 indicates that the two codes are in synchronization, a relay 25 operates a switch 26 to disconnect the variable clock and connect the clock sequence from a locker 27. Locker 27 sends a clock sequence to the coder 22, which clock sequence is held in synchronization with the received code sequence, as will be explained more fully below.

The receiver shown in FIG. 3 is a standard FM receiver. The received signal is passed through a preselector 31 which limits the received signal to the bandwidth of the signal being received. The output of the preselector 31 is sent to a mixer 32 where it is mixed with a beat frequency representing the difference between the carrier frequency and the intermediate frequency. The output of the mixer is sent through a band-pass filter 33 which allows to pass only those frequencies which are in the neighborhood of the intermediate frequency. The output of filter 33 is sent to the IF amplifier 34 which boosts the size of the received signal. IF amplifier 34 is also provided with a standard automatic gain control 34 which operates to prevent saturation in the IF amplifier 34 by techniques well known in the art. The IF amplifier output is sent to limiter 36 which eliminates fluctuations in the amplitude of the received signal. The video signal is then detected in discriminator 37 and the video signals are sent to a video display (not shown). A feedback filter 38, voltage controlled oscillator 39, and multiplier chain 40 provide automatic frequency control in a manner well known in the art. If the beat frequency provided to mixer 32 is off center there will be a portion of the output from discriminator 37 which consists of a small variation frequency. If feedback filter 38 senses the small variation frequency it will control the operation of voltage controlled oscillator 39 to bring the situation back to center. Ordinarily the output of multiplier chain 40 would be sent directly back to mixer 32 as the beat frequency. However, in the system of the present invention it is sent to the coder 22, which imposes upon it the generated code, which provides to mixer 32 not only the beat frequency but the bi-phase modulation necessary to decode the incoming signal, as will be explained more fully below.

The sync searcher shown in FIG. 4 compares the signals from the IF amplifier 34 with the signal coming just out of the mixer 32. The signal from the IF amplifier 34 is put through an RMS detector 51 which determines the average root mean square of the signal. This signal is then amplified by an amplifier 52 of a preset gain. The signal from the mixer 32 is led down to a noise IF amplifier 53 which amplifies it and sends it to an RMS detector 54 which is similar to RMS detector 51. Noise IF amplifier 53 contains an AGC circuit similar to AGC circuit 35. The output of detector 54 is then sent to a second amplifier 55 of a predetermined gain higher than that of amplifier 52. The output of amplifier 55 is then sent to a sync recognition 56 which also receives the output of amplifier 52. The signal which comes out of IF amplifier 34 has been passed through the band-pass filter 33 and thereby limited to the particular bandwidths for which the IF amplifier 34 is adapted. On the other hand the signal which passes through the noise IF amplifier 53, which has a bandwidth outside the correlated signal bandwidth, excludes the correlated signal and is a sample of uncorrelated energy alone. If the incoming signal is in synchronization with the generated code the output of mixer 32 by the operation of compressed spectrum techniques will be substantially within the narrow bandwidth. The greatest part of this signal will be passed through band-pass filter 33 and will be amplified by IF amplifier 34. On the other hand the signal which passes out of the noise IF amplifier 53 will be a sample of the noise energy outside the correlated signal bandwidth. The RMS detector 51 will detect the average root mean square value of the signal over the RF bandwidth. On the other hand, the RMS detector 54 will detect the average root mean square value over the side bandwidth from which the transmitted signal, or its correlated part, has been excluded. If the received signal is synchronized, therefore, the output of RMS detector 51, being the RMS value over the correlated frequency range, would be substantially higher than the output of RMS detector 54. The gain of amplifier 55 in turn is set at a predetermined level higher than that of amplifier 52 in order to set an arbitrary decision level for sync recognition. This level will be easily exceeded in the case of synchronization and sync recognition 56 will send a signal to the relay 25 to operate switch 26 to initiate locker 27. On the other hand, in the case of nonsynchronization the output of the band-pass filter 33 will be substantially diminished due to the fact that the received signal has not been compressed within the bandwidth of the filter. The output, therefore, of amplifier 52 will be smaller than the output of amplifier 55 and sync recognition 56 will indicate no synchronization.

In FIG. 5 oscillator 61 provides a clock signal to a frequency synthesizer 62. Frequency synthesizer 62 produces a set of three bit rates, one fast, one slow, and one approximately normal. These are passed to a switch 63 which will select one of the three in accordance with the instructions from a programmer 64. Programmer 64 will cause the variable clock to search for synchronization by operating at the fast rate for a predetermined period of time, then at the slow rate for another predetermined period of time according to a schedule which may be set to achieve synchronization in the shortest logical time. Programmer 64 may optionally be controlled by a signal from sync searcher 23, in which case programmer 64 will cause the frequency issued by switch 63 to run fast for a period of time until synchronization is momentarily indicated by sync searcher 23 at which point switch 63 will initiate a slightly slow frequency until sychronization is centered upon, at which point sync searcher 23 will send a signal to relay 25, which will disconnect the variable clock 24 and connect the code sequence from locker 27.

Figure 6:
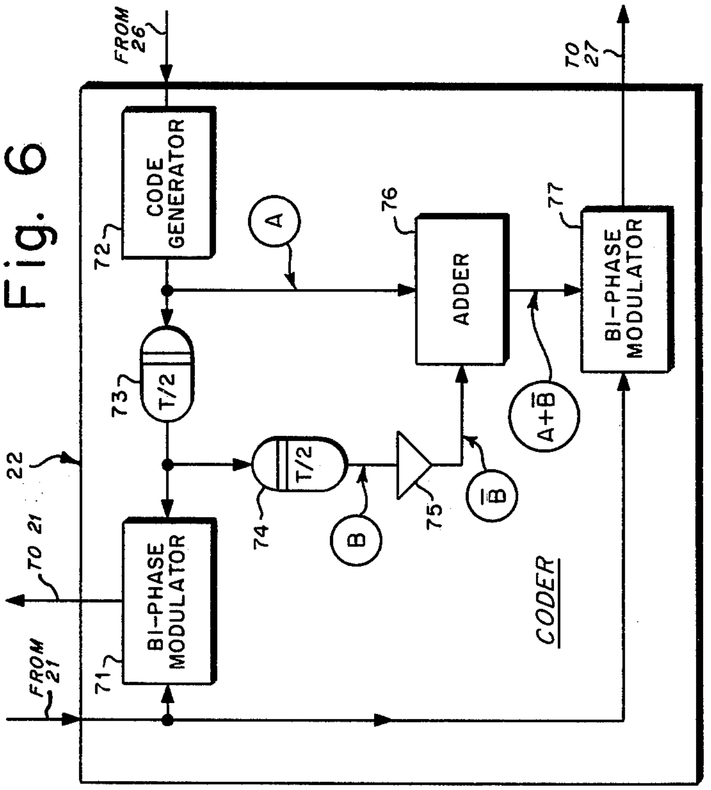
FIG. 6 shows a block schematic diagram of a coder in the receiver system of FIG. 2.

In FIG. 6 the signal from multiplier chain 40, which is the beat frequency of the receiver, is brought down to a bi-phase modulator 71. The bi-phase modulator 71 modulates the beat frequency according to the sequence from a code generator 72 and sends it back modulated to the mixer 32, where it decodes and beats down the incoming signal to the intermediate frequency. Code generator 72 receives a clock sequence from either the variable clock 24 or locker 27 through switch 26. The generated code issues from generator 72 and passes through a time delay 73 where it is delayed by a period equal to one-half of a bit period. The code as so delayed is then passed to the bi-phase modulator 71. It is also passed through a second time delay 74 and then through a polarity inverting amplifier 75, after which it is passed inverted to an adder 76, where it is combined with the code issuing directly from generator 72. The combination of these two codes is then passed to a bi-phase modulator 77 which impresses the combination of these two codes on the beat frequency in a manner which will be described subsequently in connection with FIG. 8.

Figure 7:
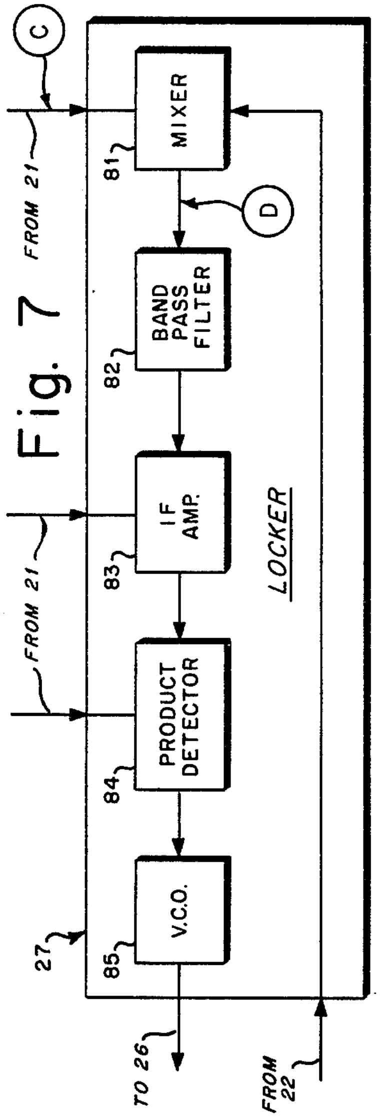
FIG. 7 shows a block schematic diagram of a locker in the receiver system of FIG. 2.

In the locker means shown in FIG. 7 a mixer 81 receives the signal from bi-phase modulator 77 and mixes it with the incoming signal from preselector 31. The resultant signal, which is beat down to the intermediate frequency, is passed through a band-pass filter 82 which is similar to filter 33. The output of the filter 82 is fed into an IF amplifier 83 similar to IF amplifier 34. IF amplifier 83 also receives the automatic gain control signal from AGC circuit 35. The output of the IF amplifier 83 is passed to a product detector 84, where it is compared with the signal issuing from the limiter 36 in the receiver in a manner which will be explained subsequently. The product detector 84 will detect if the generated code is out of phase with the received code and will issue a correcting signal to voltage controlled oscillator 85. Voltage controlled oscillator 85, which is set at the bit rate of the code, provides clock pulses back to code generator 72 in coder 22. By this means if voltage controlled oscillator 85 begins to go too slow or too fast the phase will be detected and a signal from product detector 84 will bring it back into phase.

Figure 8:
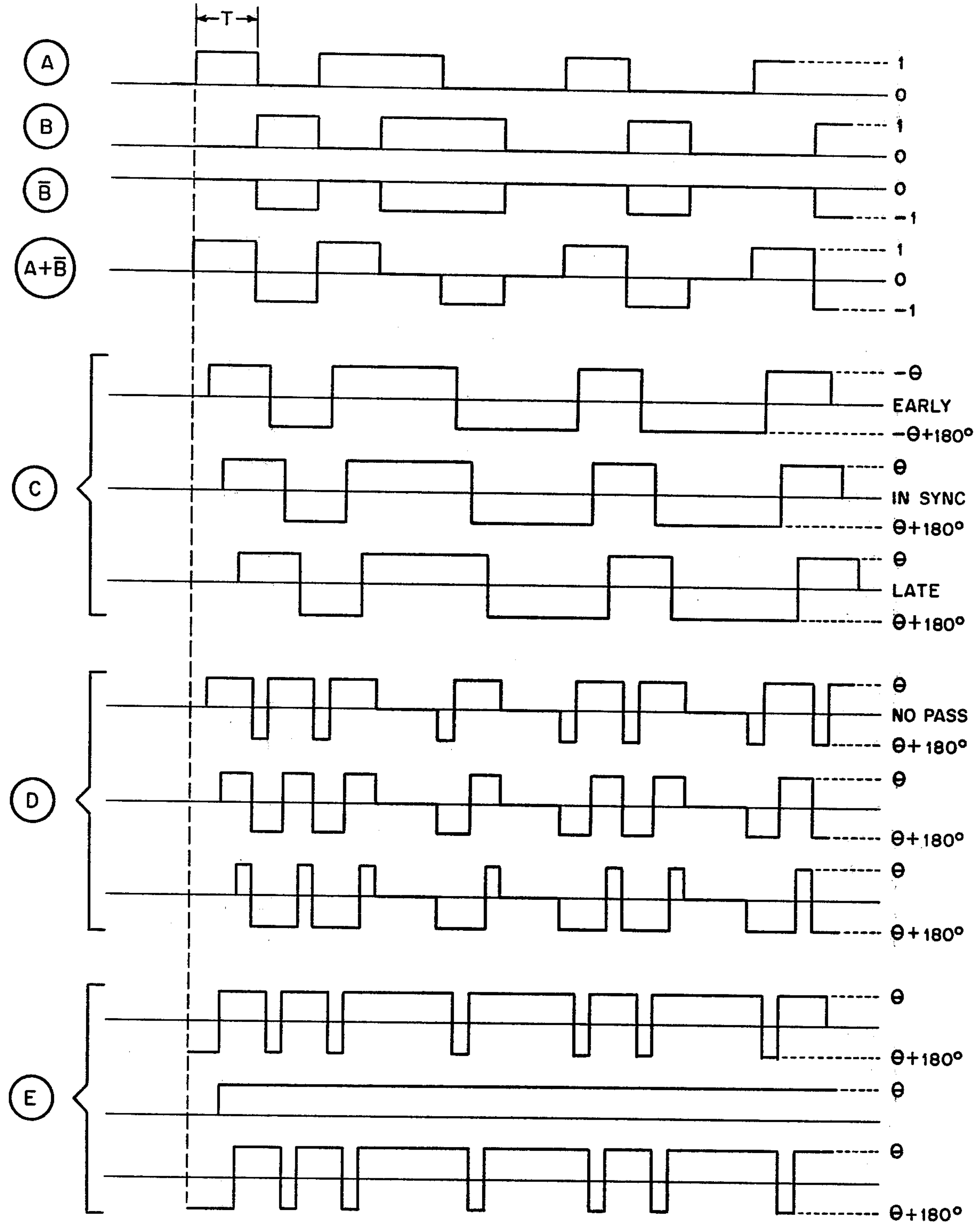
FIG. 8 shows a series of waveforms showing phase relationships at various points in the receiver system of FIG. 2.

Reference to FIG. 8 will show the operation of the coder and locker means. A code issuing from code generator 72, designated as code A of period T, is delayed by a half bit in delay line 73 and by another half bit in delay line 74, forming code B as shown in FIG. 8. Amplifier 75 reverses the polarity of the signal of code B, as shown by code B in FIG. 8. Adder 76 adds the two signals in such a way that a "1" is issued when only code A is a "1", a "−1" is issued when only B is a "−1", and a "0" is issued when A is a "1" and B is a "−1". The output of adder 76 is shown by the code designated A/B in FIG. 8. This code is sent to bi-phase modulator 77 and modulates the beat frequency in such a manner that the frequency signal is sent through unaltered when a "1" is present and sent through 180° out of phase when a "−1" is present. When the signal from adder 76 is a "0" bi-phase modulator 77 is blocked completely, allowing no beat frequency at all to pass through. The received signal is designated by C as it issues from the preselector 31. It comprises a series of periods of passed modulated carrier signal which will either be in the original phase or altered 180° out of phase as indicated. The three indicated signals for C in FIG. 8 represent signals which are received which are early, are in sync with the code generated, and which are late compared to the code generated. It will be seen that the generated code which is passed to the mixer is the code which is delayed one-half bit from the output of generator 72. This is as indicated in FIG. 8. The signal as it issues from mixer 81 is represented by the signals shown as D in FIG. 8. The three outputs of mixer 81 (showing only the phase relations thereof) are shown for the situation of early, in sync, and late condition. It will be seen that when the received signal is early, the output of mixer 81 is most often in phase. When it is late the output of mixer 81 is most often 180° out of phase. When the received signal is in synchronization the output of mixer 81 alternates equally between being in phase and 180° out of phase. The band-pass filter 82 integrates phase shift components of the output of mixer 81 and produces a signal which is substantially all one phase and which varies in amplitude according to the degree of mismatch. If the signals are synchronized, the output of filter 82 is zero. In a product detector 84 the signal from amplifier 83 which is at the intermediate frequency and has thereupon not only the intermediate frequency but the video signal as well is compared in the product detector 84 with the signal issuing from the limiter 36, which also is at the intermediate frequency with the video signal imposed thereupon. The output of mixer 32 is represented by waveforms E in FIG. 8. Filter 33 removes the phase variations in a manner similar to filter 82. It is noted that the output of filter 33 in sync is a single phase signal at the IF frequency and containing the video signal. The product detector removes video signal from the signal from IF amplifier 83 passing through and detects whether it is substantially in phase with the output of limiter 36, out of phase, or zero. The result of this detection will be passed to the voltage control oscillator 85 to control the operation thereof.

The spread spectrum technique as provided by the present invention provides a substantially improved resistance to interference. The spectrum of the signal issuing from the transmitter 15 in the present invention will be equal to the bit rate of the voltage controlled oscillator 85 where the bit rate is substantially greater than the bandwidth of the regular FM signal. By this means it will be seen that a great number of sidebands is created by the operation of the bi-phase modulation. This large number of sidebands is received in the receiver and by the operation of the second bi-phase modulation are recompressed into the standard FM bandwidth. Since the interference, deliberate or otherwise, is unlikely to have the same correlation of sidebands the level of the noise at the output of the mixers 32 will tend to be pretty much the same if not less than at the input at any frequency over the spectrum range. However, the output signal having been correlated from the large number of sidebands will be substantially increased and will, therefore, dominate the output of the mixer 32. This signal is then passed through band-pass filter 33 which further cuts out all signal outside of the desired FM bandwidth and this is passed through an IF amplifiers 34 which amplifies the desired signal. This signal is further passed through limiter 36 which restricts the variations of amplitude in the intermediate frequency further discriminating against undesired noise. It will be seen that the improvement factor $P_f$ of the present anti-jamming network is equal to the reciprocal of BT where B is the FM bandwidth of the video signal and T is the period of one bit, T being the reciprocal of the bit rate. Where the bit rate is substantially greater than the FM bandwidth BT will be substantially less than one and 1/BT will be substantially greater than one, producing a large $P_f$. The resistance to interference which is already provided by the known characteristics of FM would be increased by a factor of $P_f$.

It will be understood that various changes in the details, materials, steps and arrangement of parts, which have been herein described and illustrated in order to explain the nature of the invention, may be made by those skilled in the art within the principle and scope of the invention as expressed in the appended claims.

What is claimed is:

1. An interference proof FM video communication system comprising:

means for frequency modulating a carrier frequency by a video signal;

means for bi-phase modulating the output of said frequency modulating means in accordance with a binary code, said phases being 180° apart;

means for transmitting the output signal of said bi-phase modulator;

means remote from said transmitter for receiving said output signal;

means associated with said receiving means for mixing said received signal with a beat frequency signal bi-phase modulated by a generated code substantially identical to said binary code;

means for synchronizing said generated code with said binary code by comparing a filtered and an unfiltered value of the output of said mixing means;

means for holding said generated code in synchronization with said binary code by correlating said received signal bi-phase modulated according to said generated code with said received signal bi-phase modulated according to a time-delayed version of said generated code; and means for detecting said video signal from the output of said mixing means.

2. An interference proof FM video communication system as recited in claim 1 further comprising:

means to control said beat frequency by detection of non-video signals in the output of said detecting means.

3. A video communication system as recited in claim 1 wherein said means for synchronizing comprises:
- means for filtering the output of said mixing means;
- first means for detecting the average root mean square value of the filtered signal;
- second means for detecting the average root mean square value of the unfiltered output of said mixing means; and
- means for comparing said unfiltered RMS value with said filtered RMS value and having an output indicating synchronization.

4. A video communication system as recited in claim 3 wherein said means for comparing comprises:
- a first amplifier for raising the filtered value by a predetermined amount;
- a second amplifier for raising the unfiltered value by an amount greater than the first amplifier by a predetermined amount; and
- means for detecting when the output of said first amplifier is greater than the output of said second amplifier.

5. A video communication system as recited in claim 4 further comprising:
- a variable clock issuing a series of bits at a rate near the rate of said codes, the bit rate of said clock varying periodically;
- a code generator in said receiver, the rate of which is controlled by said clock bit rate; and
- means for switching said code generator from said variable clock to said holding means upon detection that the output of said first amplifier is greater than the output of said second amplifier.

6. A video communication system as recited in claim 5 wherein said switching means comprises:
- a relay responding to a signal from said means for detecting when the output of said first amplifier is greater than the output of said second amplifier; and
- a switch operable by said relay selectively connecting said variable clock or said holding means.

7. A video communication system as recited in claim 1 wherein said holding means comprises:
- means associated with said receiver to compare the received signal with a generated signal which is a combination of a code one-half bit early and a code one-half bit late with respect to said generated code supplied to said mixing means;
- means for detecting correlation of said received signal with the code one-half bit early or one-half bit late; and
- oscillator means controlling the rate of said generated code and controlled by said correlation detection means, adapted to change the bit rate in accordance with correlation detection to return the generated code to the midpoint between the early and late codes.

8. A video communication system as recited in claim 7 wherein said means associated with said receiving means for mixing said received signal comprises:
- a first means to mix the received signal with a beat frequency bi-phase modulated by a generated code; and said communication system further comprises:
- first means to remove the phase switch components from the output of said first mixing means;
- second means to mix the received signal with a beat frequency modulated by a code which is a combination of a generated code one-half bit early and a generated code one-half bit late and reversed in polarity;
- second means to remove phase switch components from the output of said second mixing means; and said means to compare the received signal with a generated signal comprises:
- means to compare the phases of the outputs of said first and second removing means.

9. A video communication system as recited in claim 8 wherein said oscillator controlling the bit rate is controlled by said phase comparing means and further comprising:
- a code generator controlled by said oscillator, issuing said generated code;
- a first delay line adapted to delay the output of said code generator by one-half bit;
- a beat frequency oscillator;
- first means for bi-phase modulating said beat frequency by the output of said first delay line, the output of said first bi-phase modulating means passing to said first mixing means;
- a second delay line adapted to delay the output of said first delay line by one-half bit;
- means to reverse the polarity of the output of said second delay line;
- an adder to combine the outputs of said code generator and said reversing means; and
- second means for bi-phase modulating said beat frequency by the output of said adder means, the outputs of said second bi-phase modulating means being passed to said second mising means.

10. A video communication system as recited in claim 8 wherein:
- the outputs of said first and second removing means are intermediate frequencies in phases respectively corresponding to the majority phases of the inputs of said first and second removing means, and of amplitude proportional to the ratio between said majority and minority phases; and
- said output of said phase comparing means is a voltage proportional to the amplitudes of the inputs to said phase comparing means and of a polarity selected according to the match of said inputs; and
- said oscillator means is a voltage controlled oscillator.

* * * * *